(12) United States Patent
Mizuno et al.

(10) Patent No.: US 9,764,536 B2
(45) Date of Patent: Sep. 19, 2017

(54) METHOD OF FORMING A MULTI-LAYER PAINT FILM

(71) Applicants: BASF Coatings GmbH, Münster (DE); Honda Motor Co., LTD., Minato-ku, Tokyo (JP)

(72) Inventors: Shigeyuki Mizuno, Yokohama (JP); Yasufumi Honda, Yokohama (JP); Keisuke Kojima, Yokohama (JP); Takamasa Aoki, Saitama (JP); Takeshi Ogawa, Saitama (JP)

(73) Assignees: BASF Coatings GmbH, Münster (DE); Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 14/386,464

(22) PCT Filed: Mar. 5, 2013

(86) PCT No.: PCT/IB2013/000566
§ 371 (c)(1),
(2) Date: Sep. 19, 2014

(87) PCT Pub. No.: WO2013/140238
PCT Pub. Date: Sep. 26, 2013

(65) Prior Publication Data
US 2015/0072141 A1    Mar. 12, 2015

(30) Foreign Application Priority Data

Mar. 22, 2012 (JP) ................................. 2012-065251

(51) Int. Cl.
| | |
|---|---|
| *B32B 27/40* | (2006.01) |
| *B05D 3/02* | (2006.01) |
| *B05D 7/16* | (2006.01) |
| *C09D 5/44* | (2006.01) |
| *C25D 13/04* | (2006.01) |
| *B05D 7/00* | (2006.01) |
| *B05D 7/14* | (2006.01) |

(52) U.S. Cl.
CPC ............ *B32B 27/40* (2013.01); *B05D 3/0254* (2013.01); *B05D 7/14* (2013.01); *B05D 7/142* (2013.01); *B05D 7/144* (2013.01); *B05D 7/16* (2013.01); *B05D 7/572* (2013.01); *B05D 7/574* (2013.01); *C09D 5/4473* (2013.01); *C25D 13/04* (2013.01); *B05D 7/577* (2013.01); *B05D 2401/20* (2013.01); *B05D 2503/00* (2013.01); *B05D 2504/00* (2013.01); *B32B 2250/03* (2013.01); *B32B 2250/04* (2013.01); *B32B 2250/24* (2013.01); *B32B 2307/558* (2013.01); *B32B 2307/584* (2013.01); *Y10T 428/273* (2015.01)

(58) Field of Classification Search
CPC ........ B05D 7/572; B05D 7/574; B05D 7/577; B05D 2503/00; B05D 3/0254; B05D 7/14; B05D 7/142; B05D 7/144; B05D 7/16; B32B 27/40; B32B 2250/03; B32B 2250/04; B32B 2250/24; B32B 2307/558; B32B 2307/584
USPC ....... 427/384, 407.1, 409; 428/461, 500, 515
See application file for complete search history.

(56) References Cited

U.S. PATENT DOCUMENTS

| | | | | |
|---|---|---|---|---|
| 6,342,558 | B1 * | 1/2002 | Grandhee | ........... C08F 283/006 524/457 |
| 2006/0000390 | A1 * | 1/2006 | Bolt | ...................... C04B 14/305 106/442 |
| 2009/0156715 | A1 * | 6/2009 | Dueber | .................... C08L 63/00 524/100 |

FOREIGN PATENT DOCUMENTS

| | | | |
|---|---|---|---|
| GB | 2 468 255 A * | 9/2010 | |
| JP | 2009-039626 | 2/2009 | |
| JP | 2012-125747 | 7/2012 | |
| WO | WO 2007/088110 A2 * | 8/2007 | ........... C04B 14/305 |
| WO | WO-2009/019547 | 2/2009 | |
| WO | WO2009/019547 A2 * | 2/2009 | |

OTHER PUBLICATIONS

Braun et al., "TiO2 pigment technology: a review," Progress in Organic Coatings, 20 (1992) 105-138.*
PCT International Preliminary Report on Patentability in PCT/IB2013/000566, mailed Oct. 2, 2014, 7 pages.
PCT International Search Report in PCT/IB2013/000566, mailed Sep. 5, 2014, 3 pages.

* cited by examiner

*Primary Examiner* — William Phillip Fletcher, III
(74) *Attorney, Agent, or Firm* — Servilla Whitney LLC

(57) ABSTRACT

A multi-layer paint film satisfies paint film performance, such as water resistance, impact resistance and the like, required of an automobile paint film and which has excellent paint film appearance is obtained. The method comprises coating an aqueous first base paint (A) over an electrodeposited cured paint film to form a first base paint film, and then coating an aqueous second base paint (B) over the first base paint film without carrying out preliminary drying by heating after forming the first base paint film to form a second base paint film, preliminary drying by heating is carried out after forming the second base paint film, coating a single-liquid type clear paint (C) over the second base paint film to form a clear coat paint film. These three paint film layers are heated and cured at the same time.

4 Claims, No Drawings

METHOD OF FORMING A MULTI-LAYER PAINT FILM

CROSS-REFERENCE TO RELATED APPLICATIONS

This application is the National Stage entry of PCT/IB2013/000566, filed on Mar. 5, 2013, which claims priority to Japanese Application Number 2012-065251, filed on Mar. 22, 2012, which are incorporated herein by reference in their entireties.

TECHNICAL FIELD

The invention concerns a novel method of forming a multi-layer paint film which can be used in various fields and especially in the field of automobile painting.

BACKGROUND TECHNOLOGY

Generally methods of forming multi-layer paint films where the object which is being painted is an automobile body are carried out by forming an electrostatic paint film on the object which is being painted and heating and curing and then forming a multi-layer paint film comprising a mid-coat paint film, a base paint film and a clear paint film. Furthermore, at the present time aqueous paints are being used for the mid-coat paint and base paint in order to cut down volatile organic solvents (VOC).

Thus in recent years the so-called three-coat-one-bake (3C1B) system multi-layer paint film forming method in which a base paint film and a clear paint film are formed over a mid-coat paint film which has been subjected to preliminary drying without heating and curing the mid-coat paint film after coating the mid-coat paint on an electrodeposited paint film and forming a mid-coat pant film and these three paint film layers are all heated and cured at the same time has come into use from the viewpoint of energy conservation.

Moreover, a multi-layer paint film forming method with a novel 3C1B system in which an aqueous first base paint, an aqueous second base paint and a clear paint are coated without using a mid-coat paint in this 3C1B type multi-layer paint film forming method has been proposed. In this method of forming a multi-layer paint film the use of the mid-coat base in the coating process is not essential and, since coating can be achieved with just a top-coat booth, it is possible to achieve energy savings.

The use of an aqueous first base paint which includes as an essential component a hydroxyl group-containing non-ionic resin which has a specified acid value and hydroxyl group value which has a specified content of ethylene oxide units and/or propylene oxide units in a multi-layer paint film forming method of the 3C1B type in which an aqueous first base paint, an aqueous second base paint and a clear paint are coated over an electrodeposited paint film has been disclosed in Patent Document 1 as such a method of forming a multi-layer paint film with a 3C1B system in which no mid-coat paint is used.

Furthermore, the use of a first aqueous colored paint which includes titanium oxide which has a specified specific surface area in a multi-layer paint film forming method of the 3C1B type in which a first aqueous colored paint, a second aqueous colored paint and a clear paint are coated over an electrodeposited paint film has been disclosed in an earlier application, Patent Document 2.

An excellent paint film appearance can be obtained in a multi-layer paint film forming method of the 3C1B type in which no mid-coat paint is used and, moreover, a multi-layer paint film forming method with which an excellent paint film appearance can be obtained even in those cases where the aqueous second base paint is coated without carrying out preliminary drying after coating the aqueous first base paint has been obtained by means of the inventions described in Patent Documents 1 and 2.

PRIOR ART LITERATURE

Patent Documents

Patent Document 1:
Japanese unexamined patent application laid open 2009-039626
Patent Document 2:
Japanese patent application 2010-282286

OUTLINE OF THE INVENTION

Problems to be Resolved by the Invention

Hence, the present invention provides a multi-layer paint film forming method with which multi-layer paint films which satisfy the paint film performance such as water resistance, impact resistance and the like required of automobile external paint films and which have excellent paint film appearance can be obtained even in those cases where the aqueous second base paint is coated over a first base paint film without carrying out preliminary drying after forming the aforementioned first base paint film by coating an aqueous first base paint in a multi-layer paint film forming method with a 3C1B system in which no mid-coat paint is used.

Means of Resolving these Problems

As a result of thorough research carried out with a view to resolving the aforementioned problems the inventors have discovered that the abovementioned problems can be resolved by including a specified water-soluble or water-dispersible polyurethane resin and specified titanium oxide in the aqueous first base paint, and the invention is based upon this discovery.

That is to say, the present invention concerns a method of forming a multi-layer paint film which includes a first base paint film forming process in which an aqueous first base paint (A) is coated over an electrodeposited cured paint film and a first base paint film is formed, a second base paint film forming process in which an aqueous second base paint (B) is coated over the aforementioned first base paint film without carrying out preliminary drying by heating after said first base paint film forming process and a second base paint film is formed, a clear paint film forming process in which preliminary drying is carried out by heating after said second base paint film forming process, a single-liquid type clear paint (C) is coated over the aforementioned second base paint film and a clear coat paint film is formed and a heating and curing process in which these three paint film layers are heated and cured at the same time wherein the aforementioned aqueous first base paint (A) includes water-soluble or water-dispersible polyurethane resin (A1) of acid value of less than 15 mgKOH/g and hydroxyl group value of from 10 to 100 mgKOH/g and titanium oxide (A2) of specific surface area not more than 13 m$^2$/g, and the aforementioned water-soluble or water-dispersible polyurethane resin (A1) includes from 4 to 15 mass % in the resin of at least one of ethylene oxide units and propylene oxide units and the mass content ratio of the aforementioned titanium oxide (A2) is from 40 to 60 mass % with respect to the paint solid fraction of aforementioned aqueous first base paint (A).

Furthermore, the present invention concerns a method of forming a multi-layer paint film in which, in the abovementioned method for forming a multi-layer paint film, the water-soluble or water-dispersible polyurethane resin (A1)

is a water-soluble or water-dispersible polyurethane resin which has been obtained by the reaction of polyester polyol and polyisocyanate compound.

Also, the invention concerns a method of forming a multi-layer paint film in which, in the abovementioned method for forming a paint film, the dry film thickness of the first base paint film formed by coating the aqueous first base paint (A) is from 20 to 40 µm. Moreover, the invention concerns paint films which have been formed by means of the abovementioned methods for forming a multi-layer paint film.

Effect of the Invention

In the method for forming a multi-layer paint film of this invention it is possible to obtain multi-layer paint films which satisfy the paint film performance such as water resistance, impact resistance and the like required of an automobile external paint film and which have excellent paint film appearance even in those cases where an aqueous second base paint is coated over an aqueous first base paint film without carrying out preliminary drying after forming the aforementioned first base paint film by coating an aqueous first base paint.

[Embodiment of the Invention]

The aqueous first base paint (A) contains a water-soluble or water-dispersible polyurethane resin (A1) as the base resin. The water-soluble or water-dispersible polyurethane resin (A1) is obtained with a known method with polyol, polyisocyanate compound, dimethylolalkane acid, polyhydric alcohol and the like as raw material components, and there are at least one of ethylene oxide units and propylene oxide units, and preferably ethylene oxide units, in the resin.

Examples of the polyol include polyester polyols, polyether polyols, polycarbonate polyols and the like, but polyester polyols are preferred from the viewpoint of chipping resistance.

The polyester polyols can be obtained by means of known methods in which an esterification reaction which has polybasic acid and polyhydric alcohol as the raw material components is used.

Generally polycarboxylic acids are used for the polybasic acid which is a raw material component of a polyester polyol, but mono-carboxylic acids can be used conjointly, as required. Examples of the polycarboxylic acids include phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azeleic acid, fumaric acid, maleic acid, itaconic acid, pyromellitic acid and the anhydrides of these acids. The polybasic acids can be used individually and combinations of two or more types can also be used.

The polyester polyol is a raw material component and, furthermore, glycols and polyhydric alcohols which are trihydric or more can be cited as polyhydric alcohols which are also raw material components of the water-soluble or water-dispersible polyurethane resin (A1). Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexane-dimethanol, 3,3-diethyl-1,5-pentanediol and the like. Furthermore, examples of trihydric and higher polyhydric alcohols include glycerin, trimethylolethane, trimethylolpropane, pentaerythritol, dipentaerythritol and the like. These polyhydric alcohols can be used individually, and combinations of two or more types can also be used.

Examples of the polyisocyanate compounds which react with polyols include aromatic diisocyanates such as 4,4'-diphenylmethane diisocyanate, 2,4- or 2,6-tolylene diisocyanate, 1,5-naphthalene diisocyanate, p- or m-phenylene diisocyanate and the like, alicyclic diisocyanates such as isophorone diisocyanate, 4,4'-dicyclohexylmethane diisocyanate, 1,4-cyclo-hexylene diisocyanate, hydrogenates of tolylene diisocyanate and the like, aliphatic diisocyanates such as hexamethylene diisocyafiate and the like, xylylene diisocyanate, m-tetramethylxylylene diisocyanate and the like. From among these the alicyclic diisocyanates are preferred from the viewpoint of yellowing resistance. These polyisocyanate compounds can be used individually and combinations of two or more types can also be used.

Examples of the dimethylolalkane acids include dimethylolpropionic acid, dimethylolbutanoic acid, dimethylolpentanoic acid, dimethylolheptanoic acid, dimethyloloctanoic acid, dimethylolnonanoic acid and the like. These dimethylolalkane acids can be used individually and combinations of two or more types can also be used.

The method in which, when producing the water-soluble or water-dispersible polyurethane resin (A1), polyethylene glycol, polypropylene glycol or the mono-alkyl ethers thereof and the like are used as reaction components can be cited as examples of the methods with which ethylene oxide units and propylene oxide units are introduced into the water-soluble or water-dispersible polyurethane resin (A1).

Uniol D-1000 (polypropylene glycol, produced by the Ni. Yu. Co.), Uniox M-1000 (polyethylene glycol mono-methyl ether, produced by the Ni. Yu. Co.) can be cited as examples of commercial polyethylene glycols, polypropylene glycols and mono-alkyl ethers thereof.

The total mass content ratio of ethylene oxide units and propylene oxide units included in the water-soluble or water-dispersible polyurethane resin (A1) is from 4 to 15 mass %, and preferably from the viewpoint of the emulsion stability of the resin in the aqueous paint and the water resistance of the paint film from 5 to 12 mass %, with respect to the resin solid fraction of the water-soluble or water-dispersible polyurethane resin (A1). In those cases where it is less than 4 mass % there are cases where the resin coagulates in the paint, and if it exceeds 15 mass % then there are cases where the water resistance of the paint film is reduced.

The acid value of the water-soluble or water-dispersible polyurethane resin (A1) is less than 15 mgKOH/g and, from the viewpoint of the paint film appearance, it is preferably from 8 to 13 mgKOH/g. If it is 15 mgKOH/g or above then phase-mixing occurs at the interface between the first base paint film and the second base paint film and there are cases where the paint film appearance declines.

The hydroxyl group value of the water-soluble or water-dispersible polyurethane resin (A1) is from 10 to 100 mgKOH/g and, from the viewpoints of the emulsion stability of the resin in an aqueous paint and water resistance, it is preferably from 20 to 80 mgKOH/g. With less than 10 mgKOH/g there are cases where the resin coagulates in the aqueous paint, and if it exceeds 100 mgKOH/g then there are cases where the water resistance of the paint film is reduced.

The number average molecular weight of the water-soluble or water-dispersible polyurethane resin (A1) is, from the viewpoints of chipping resistance and paint film appearance, preferably from 500 to 20,000, and more desirably from 1,000 to 10,000. Moreover the number average molecular weight in this specification is the value obtained by means of gel permeation chromatography (GPC) with polystyrene as the standard material.

Known water-soluble or water-dispersible resins can be used conjointly as base resins together with the abovementioned water-soluble or water-dispersible polyurethane resin (A1) in the aqueous first base paint (A). Examples of the known water-soluble or water-dispersible resins include water-soluble or water-dispersible polyester resins, water-soluble or water-dispersible acrylic resins, water-soluble or water-dispersible acrylic/urethane resins and the like.

The titanium oxide (A2) can be obtained by means of a known method known as the chlorine method or the sulfuric acid method and it preferably has a rutile-type crystal form.

The specific surface area of the titanium oxide (A2) is less than 13 cm$^2$/g and, from the viewpoint of the base-concealing properties, preferably at least 12 cm$^2$/g but less than 13 cm$^2$/g. Moreover, in this specification the specific surface area is the value obtained by means of the BET method.

The mass content proportion of titanium oxide (A2) is from 40 to 60 mass % with respect to the paint solid fraction of the aqueous first base paint (A) and, from the viewpoints of the base-concealing properties and impact resistance it is preferably from 45 to 55 mass %. If the mass content proportion of titanium oxide (A2) is less than 40 mass % with respect to the paint solid fraction of the aqueous first base paint (A) then there are cases where the base-concealing properties are inadequate, and if the mass content proportion of titanium oxide (A2) exceeds 60 mass % with respect to the paint solid fraction of the aqueous first base paint (A) then there are cases where the impact resistance and the like are reduced.

No particular limitation is imposed upon the aqueous second base paint (B) of the method of forming a multi-layer paint film of this invention provided that it contains water-soluble or water-dispersible resin as the base resin.

Preferably one or more types of water-soluble or water-dispersible resin selected from among the polyurethane resins, polyester resins and acrylic resin can be used as the water-soluble or water-dispersible resin.

With the water-soluble or water-dispersible polyurethane resin (A1) and other water-soluble or water-dispersible resin which is the base resin of the aqueous first base paint (A) and the base resin of the aqueous second base paint (B) it is desirable that at least some of the acid groups which the resins have are neutralized with a basic substance. By this means the resin can exist in the aqueous paint in a stable form.

Examples of the basic substance include ammonia, morpholine, N-alkylmorpholine, monoisopropanolamine, methylethanolamine, methylisopropanolamine, dimethylethanolamine, diisopropanolamine, diethanolamine, triethanolamine, diethylethanolamine, methylamine, ethylamine, propylamine, butylamine, 2-ethylhexylamine, dimethylamine, diethylamine, dipropylamine, dibutylamine, trimethylamine, triethylamine, triisopropylamine, tributylamine and the like. One of these basic substances may be used individually, or a combination of two or more types may be used.

The aqueous first base paint (A) and the aqueous second base paint (B) preferably include a crosslinking agent. Examples of the crosslinking agent include amino resins, polyisocyanate compounds, blocked polyisocyanate compounds and the like. One of these crosslinking agents may be used individually or a combination of two or more types may be used.

Amino resin is a general name of resins where formaldehyde as been added to a compound which contains amino groups and condensed, and actual examples include melamine resins, urea resins, guanamine resins and the like, but the melamine resins are preferred.

Examples of melamine resins include the partially or completely methylolated melamine resins obtained by reacting melamine and formaldehyde, the partially or completely alkyl etherified melamine resins obtained by the partial or complete etherification of the methylol groups of a methylolated melamine resin with an alcohol component, the imino group-containing type melamine resins, and melamine resins which are mixtures of these. Here examples of the alkyl ether type melamine resins include methylated melamine resins, butylated melamine resins, methyl/butyl mixed alkyl type melamine resins and the like.

When amino resins are used as crosslinking agents the mass content ratio with respect to the sum total of the solid fraction of the base resin is preferably from 20/80 to 60/40, and more desirably from 25/75 to 35/65, from the viewpoint of water resistance and chipping resistance.

Examples of the polyisocyanate compound include aromatic diisocyanates such as 4,4'-diphenylmethane diisocyanate, 2,4- or 2,6-tolylene diisocyanate, 1,5-naphthalene diisocyanate, p- or m-phenylene diisocyanate and the like, alicyclic diisocyanates such as isophorone diisocyanate, 4,4'-dicyclohexylmethane diisocyanate, 1,4-cyclohexylene diisocyanate, hydrogenates of tolylene diisocyanate and the like, aliphatic diisocyanates such as hexamethylene diisocyanate and the like, xylylene diisocyanate, m-tetramethylxylylene diisocyanate and the like. From among these the alicyclic diisocyanates are preferred from the viewpoint of yellowing resistance.

The compounds where the isocyanate groups of polyisocyanate compounds have been protected with blocking agents are blocked polyisocyanate compounds. Examples of the blocking agent include alcohols such as butanol and the like, oximes such as methyl ethyl ketoxime and the like, lactams such as ε-caprolactam and the like, diketones such as acetoacetic acid diester and the like, imidazoles such as imidazole, 2-ethylimidazole and the like, or phenols such as m-cresol and the like.

When polyisocyanate compounds or blocked polyisocyanate compounds are used as crosslinking agents the equivalent ratio of isocyanate groups of the crosslinking agent and the hydroxyl groups of the base resin (NCO/OH) is preferably from 0.5 to 2.0, and more desirably from 0.8 to 1.5, from the viewpoints of water resistance, chipping resistance and the like.

Various types of pigment such as coloring pigments, glitter pigments, true pigments and the like can be included in the aqueous first base paint (A) and the aqueous second base paint (B). Examples of coloring pigments include inorganic pigments such as chrome yellow, yellow iron oxide, iron oxide, carbon black, titanium dioxide and the like and organic pigments such as the azo-lake pigments, insoluble azo-based pigments, condensed azo-based pigments, phthalocyanine-based pigments, indigo pigments, perinone-based pigments, perylene-based pigments, dioxane-based pigments, quinacridone-based pigments, isoindolinone-based pigments, metal complex pigments and the like. Furthermore, examples of glitter pigments include aluminum flake pigments, alumina flake pigments, mica pigments, silica flake pigments, glass flake pigments and the like. Moreover, examples of true pigments include calcium carbonate, baryta, precipitated barium sulfate, clay, talc and the like. One of these pigments may be used individually, or a combination of two or more types may be used.

One or more of the various types of additive such as surface controlling agents, anti-foaming agents, surfactants, film formation promoters, preservatives, ultraviolet absorbers, light-stabilizers, antioxidants and the like, the various types of rheology controlling agent and the various types of organic solvent and the like can be included in the aqueous first base paint (A) and the aqueous second base paint (B).

The aqueous first base paint (A) and the aqueous second base paint (B) may be provided for coating after being diluted to the appropriate viscosity using water and, depending on the particular case, a small amount of organic solvent, amine and the like.

A single-liquid type clear paint (C) can be used for the clear paint of the method of forming a multi-layer paint film of this invention. Examples of the base resin of the clear paint include acrylic resins, polyester resins, alkyd resins and the like. No particular limitation is imposed upon the curing system provided that it can be used for a single-liquid type paint, and examples include melamine curing, acid/epoxy curing, blocked isocyanate curing and the like. From among these the single-liquid type clear paints of the acid/epoxy curing type which have acrylic resin for the base resin are preferred from the viewpoints of weather resistance and acid resistance.

The methods which are generally used in the automobile industry, for example air-spay painting, air-atomization type electrostatic painting, bell rotation atomization type electrostatic painting and the like, can be used as the method of applying each of the paints in the method of forming a multi-layer paint film of this invention.

With the method of forming a multi-layer paint film of this invention first of all the aqueous first base paint (A) is coated over an electrodeposited and cured paint film.

No particular limitation is imposed upon the temperature and humidity conditions when coating the aqueous first base paint (A) and, for example, they are from 10 to 40° C. and from 65 to 85% (relative humidity). Furthermore, the dry film thickness of the first base paint film when the aqueous first base coat paint (A) has been coated is, for example, from 10 to 40 μm and, from the viewpoints of weather resistance and chipping resistance, preferably from 20 to 40 μm.

In the method of forming a multi-layer paint film of this invention, after coating the first aqueous base paint (A) the aqueous second base paint (B) is coated over the first aqueous base paint film without carrying out preliminary drying.

No particular limitation is imposed upon the temperature and humidity conditions when coating the aqueous second base paint (B) and, for example, they are from 10 to 40° C. and 65 to 85% (relative humidity). Furthermore, the dry film thickness of the second base paint film when the aqueous second base coat paint (B) has been coated is, for example, from 5 to 15 μm.

In the method of forming a multi-layer paint film of this invention preliminary drying may be carried out after coating the aqueous second base paint (B). Moreover, the conditions in those cases where preliminary drying is carried out are preferably from 30 to 100° C. for from 3 to 10 minutes.

In the method of forming a multi-layer paint film of this invention the single-liquid type clear paint (C) is coated over the second base paint film.

No particular limitation is imposed upon the dry film thickness of the clear paint film when the single-liquid type clear paint (C) has been coated but it is, for example, from 10 to 100 μm.

In the method of forming a multi-layer paint film of this invention a multi-layer paint film which has excellent paint film appearance can be obtained by heating and curing the first base paint film, second base paint film and clear paint film which have been formed with the method outlined above at the same time. The heating and curing temperature and time in the heating and curing process of the method of forming a multi-layer paint film of this invention are from 120 to 170° C. and from 10 to 60 minutes.

ILLUSTRATIVE EXAMPLES

The invention is described in more detail below by means of illustrative examples, but the invention is not limited by these illustrative examples. Moreover, in the absence of any particular indication to the contrary, parts, and ratio in each case indicate parts by mass, mass % and mass ratio.

Example 1-1 of Production

Production of Polyester Resin Solution P-1

Lauric acid (10 parts), 30 parts of phthalic acid anhydride, 6.7 parts of polyethylene glycol mono-methyl ether (trade name Uniox M1000, produced by the Ni. Yu. Co., number average molecular weight 1,000), 14.9 parts of adipic acid, 30.3 parts of neopentyl glycol and 8.1 parts of trimethylolpropane were introduced into a reaction vessel which had been furnished with a reflux condenser which was fitted with a reaction-water separating tube, nitrogen gas delivery apparatus, a thermometer and stirring apparatus and the temperature was raised to 120° C. and the raw materials were dissolved and then, while stirring, the temperature was raised to 160° C. After being maintained at 160° C. for 1 hour the temperature was gradually raised to 230° C. over a period of 5 hours. The temperature was maintained at 230° C. for 2 hours and the reaction continued and after the acid value had reached 5 mgKOH/g the temperature was lowered to 80° C. and then 23 parts of toluene were added and the polyester resin solution P-1 was obtained. The characteristic values of the polyester resin solution P-1 were solid fraction mass %, number average molecular weight 1,500, hydroxyl group value 72 mgKOH/g and acid value 5 mgKOH/g.

Examples 1-2 to 1-5 of Production

Production of Polyester Resin Solutions P-2 to P-5

The polyester resin solutions P-2 to P-5 were obtained with the same method as in Example 1-1 of Production on the basis of the formulations and conditions shown in Table 1. The characteristic values of the polyester resin solutions obtained are summarized in Table 1.

TABLE 1

| Polyester Resin Solution | P-1 | P-2 | P-3 | P-4 | P-5 |
|---|---|---|---|---|---|
| Lauric Acid | 10 | 10 | 10 | 10 | 10 |
| Phthalic Acid Anhydride | 30 | 30 | 30 | 30 | 30 |
| Polyethylene Glycol Mono-methyl Ether (Note 1) | 6.7 | 16.0 | 4.5 | 25.0 | 6.7 |
| Adipic Acid | 14.9 | 10.2 | 16.1 | 5.0 | 15.7 |
| Neopentyl Glycol | 30.3 | 23.4 | 31.6 | 19.5 | 27.3 |
| Trimethylolpropane | 8.1 | 10.4 | 7.8 | 10.5 | 10.3 |
| Subtotal | 100.0 | 100.0 | 100.0 | 100 | 100 |
| (Amount of Water Eliminated During Synthesis) | 8.1 | 6.8 | 8.4 | 5.6 | 8.0 |
| Toluene | 23.0 | 23.3 | 22.9 | 23.6 | 23.0 |
| Total | 114.9 | 116.5 | 114.5 | 118.0 | 115.0 |
| Resin Solid Fraction (mass %) | 80.0 | 80.0 | 80.0 | 80.0 | 80.0 |
| Number Average Molecular Weight | 1,500 | 1,500 | 1,500 | 1,500 | 2,000 |
| Hydroxyl Group Value (mgKOH/g) | 72 | 72 | 72 | 72 | 72 |
| Resin Acid Value (mgKOH/g) | 5 | 10 | 5 | 5 | 15 |
| Ethylene Oxide Structural Unit Content (mass %) | 7.3 | 16.6 | 4.9 | 26.5 | 7.3 |

The details of each of the compounded components shown in Table 1 and supplementary facts will be described.
(Note 1): Polyethylene glycol mono-methyl ether (trade name Uniox M1000, produced by the Ni. Yu. Co., number average molecular weight 1,000)

Example 2-1 of Production

Production of Polyurethane Resin Solution PUR-1

Polyester resin solution P-1 (83.9 parts), 1.6 parts of dimethylolpropionic acid, 2.3 parts of neopentyl glycol, 22.7 parts of isophorone diisocyanate and 40 parts of methyl ethyl ketone were introduced into a reaction vessel which had been furnished with nitrogen gas delivery apparatus, a thermometer and stirring apparatus and, while stirring, the temperature was raised to 80° C. and each of the components reacted while being maintained at 80° C. When the isocyanate value reached 0.52 meq/g 6.3 parts of trimethylolpropane were added and the reaction was continued at 80° C. Then, when the isocyanate value reached 0.01 meq/g 25.0 parts of butyl cellosolve were added and the reaction was terminated. Subsequently the temperature was raised to 100° C. and the toluene and methyl ethyl ketone were removed under reduced pressure. Then the temperature was dropped to 50° C., 1.3 parts of dimethylethanolamine were added and the acid groups were neutralized and then 258.4 parts of de-ionized water were added and the polyurethane resin solution PUR-1 was obtained. The characteristic values of the polyurethane resin solution PUR-1 were solid fraction 26 mass %, number average molecular weight 4,000, hydroxyl group value 52 mgKOH/g, acid value 10 mgKOH/g.

Examples 2-2 to 2-5 of Production

Production of Polyurethane Resin Solutions PUR-2 to 5

The polyurethane resin solutions PUR-2 to P-5 were obtained with the same method as in Example 2-1 of Production on the basis of the formulations shown in Table 2. The characteristic values of the polyurethane resin solutions obtained are summarized in Table 2.

TABLE 2

| Polyurethane Resin Solution | PUR-1 | PUR-2 | PUR-3 | PUR-4 | PUR-5 |
|---|---|---|---|---|---|
| P-1 (Note 2) | 83.9 | | | | |
| P-2 (Note 2) | | 83.9 | | | |
| P-3 (Note 2) | | | 83.9 | | |
| P-4 (Note 2) | | | | 83.9 | |
| P-5 (Note 2) | | | | | 83.9 |
| Dimethylolpropionic Acid | 1.6 | 1.6 | 1.6 | 1.6 | 1.6 |
| Neopentyl Glycol | 2.3 | 2.3 | 2.3 | 2.3 | 2.3 |
| Isophorone Diisocyanate | 22.7 | 22.7 | 22.7 | 22.7 | 22.7 |
| Methyl Ethyl Ketone (Note 3) | 40 | 40 | 40 | 40 | 40 |
| Trimethylolpropane | 6.3 | 6.3 | 6.3 | 6.3 | 6.3 |
| Butyl Cellosolve | 25 | 25 | 25 | 25 | 25 |
| Dimethylethanolamine | 1.3 | 1.7 | 1.3 | 1.3 | 2.1 |
| De-ionized Water | 258.4 | 258.0 | 258.4 | 258.4 | 257.6 |
| Total | 317.6 | 317.6 | 384.7 | 317.6 | 317.6 |
| Resin Solid Fraction (mass %) | 26.0 | 26.0 | 26.0 | 26.0 | 26.0 |

TABLE 2-continued

| Polyurethane Resin Solution | PUR-1 | PUR-2 | PUR-3 | PUR-4 | PUR-5 |
|---|---|---|---|---|---|
| Number Average Molecular Weight | 4,000 | 4,000 | 4,000 | 4,000 | 4,000 |
| Hydroxyl Group Value (mgKOH/g) | 52 | 52 | 52 | 52 | 52 |
| Acid Value (mgKOH/g) | 10 | 13 | 10 | 10 | 17 |
| Ethylene Oxide Unit Content (mass %) | 5 | 11 | 3 | 18 | 5 |

The details of each of the compounded components shown in Table 2 and supplementary facts will be described.
(Note 2): The solvent in the polyester resin solution was removed under reduced pressure and so it is not included in the "Total" in the table.
(Note 3): The methyl ethyl ketone was removed under reduced pressure and so it is not included in the "Total" in the table.

Example 3-1 of Production

Production of Aqueous First Base Paint A-1

Titanium oxide T-1 (specific surface area 12 m$^2$/g, average particle size 0.28 μm, 30 parts), 100 parts of polyurethane resin PUR-1, 10 parts of aqueous polyester resin (trade name Baihidrol E-270, produced by the Sumika Beyer Urethane Co., solid fraction 70%) and 60 parts of de-ionized water were added to a container and dispersed in a mortar mill until the pigment particle size became 10 μm or below. Then 12 parts of melamine resin (trade name Cymel 327, produced by the Cytec Industries Co., methylated melamine resin, solid fraction 90%), 1.5 parts of surface controlling agent (trade name Biketol WS, produced by the Bichemie Co.) and 0.3 part of rheology controlling agent (trade name Primal ASE-60, produced by the Dow Chemical Co.) were added and mixed in a dissolver and the aqueous first base paint A-1 was obtained.

Examples 3-2 to 3-7 of Production

Production of Aqueous First Base Paints A-2 to A-7

The aqueous first base paints A-2 to A-7 were produced with the same method as in Example 3-1 of Production on the basis of the formulations shown in Table 3.

TABLE 3

| Aqueous First Base Paint | A-1 | A-2 | A-3 | A-4 | A-5 | A-6 | A-7 | A-8 | A-9 |
|---|---|---|---|---|---|---|---|---|---|
| T-1 | 35 | 65 | 45 | 45 | 45 | 45 | | 19 | 82 |
| T-2 (Note 4) | | | | | | | 45 | | |
| PUR-1 | 100 | 100 | | | | | | | |
| PUR-2 | | | 100 | | | | 100 | 100 | 100 |
| PUR-3 | | | | 100 | | | | | |
| PUR-4 | | | | | 100 | | | | |
| PUR-5 | | | | | | 100 | | | |
| Aqueous Polyester Resin (Note 5) | 10 | 10 | 10 | 10 | 10 | 10 | 10 | 10 | 10 |
| Melamine Resin (Note 6) | 12 | 12 | 12 | 12 | 12 | 12 | 12 | 12 | 12 |
| Surface Controlling Agent (Note 7) | 1.5 | 1.5 | 1.5 | 1.5 | 1.5 | 1.5 | 1.5 | 1.5 | 1.5 |
| Rheology Controlling Agent (Note 8) | 0.3 | 0.3 | 0.3 | 0.3 | 0.3 | 0.3 | 0.3 | 0.3 | 0.3 |
| De-ionized Water | 120 | 150 | 130 | 130 | 130 | 130 | 130 | 100 | 165 |
| Total | 278.8 | 338.8 | 298.8 | 298.8 | 298.8 | 298.8 | 298.8 | 242.8 | 370.8 |

TABLE 3-continued

| Aqueous First Base Paint | A-1 | A-2 | A-3 | A-4 | A-5 | A-6 | A-7 | A-8 | A-9 |
|---|---|---|---|---|---|---|---|---|---|
| Titanium Oxide Content in the Paint Solid Fraction (mass %) | 43.4 | 58.8 | 49.7 | 49.7 | 49.7 | 49.7 | 49.7 | 30.3 | 65.2 |
| Paint Solid Fraction (mass %) | 28.9 | 32.6 | 30.3 | 30.3 | 30.3 | 30.3 | 30.3 | 25.9 | 33.9 |

The details of each of the compounded components shown in Table 3 and supplementary facts will be described.
(Note 4):
Titanium oxide T-2 (specific surface area 18 m$^2$/g, average particle diameter 0.27 μm)
(Note 5):
Aqueous polyester resin (trade name Baihidrol E-270, produced by the Sumika Beyer Co., solid fraction 70%)
(Note 6):
Melamine resin (trade name Cymel 327, produced by the Cytec Industries Co., methylated melamine resin, solid fraction 90%)
(Note 7):
Surface controlling agent (trade name Biketol WS, produced by the Bichemie Co.)
(Note 8):
Rheology controlling agent (trade name Primal ASE-60, produced by the Dow Chemical Co.)

Paint film performance evaluations (paint film appearance, water resistance, impact resistance, base-concealing properties) were carried out with the methods outlined below. Moreover, the aqueous first base paint and the aqueous second base paint were provided for coating after being diluted with de-ionized water in such a way that the Ford cup #4 viscosity was 40 seconds (20° C.). Furthermore, the temperature and humidity conditions when coating the aqueous first base paint and the aqueous second base paint were set to 25° C. and 75% (relative humidity).

Example 1

Cationic electrodeposition paint (trade name CathoGuard No. 500, produced by the BASF Coating Japan Co. Ltd.) was electrodeposition coated on a mild steel sheet which had been subjected to a zinc phosphate chemical forming treatment in such as way as to provide a dry film thickness of 20 μm and heated and cured for 30 minutes at 160° C. to provide a sheet with an electrodeposited paint film (electrodeposited sheet) for use in the evaluations.
(1) Evaluation of Paint Film Appearance, Water Resistance and Impact Resistance
The aqueous first base paint A-1 was coated on an electrodeposited sheet in such a way as to provide a dry film thickness of 30 μm. After coating, the sheet was left to stand for 5 minutes and then the aqueous second base paint Aqua BC-3 (produced by the BASF Coatings Japan Co. Ltd., silver metallic color) was coated in such a way as to provide a dry film thickness of 12 μm. After coating, the sheet was left to stand for 5 minutes and then preliminary heating was carried out for 3 minutes at 80° C. After being left to cool to room temperature the single-liquid type clear paint Belcoat No. 6100 Clear (trade name, produced by the BASF Coatings Japan Co. Ltd, acrylic resin/melamine curing type) was coated in such a way as to provide a dry film thickness of 35 μm. After coating, the sheet was left to stand at room temperature for 10 minutes and then heating and curing were carried out at 140° C. for 25 minutes and a sheet for evaluation purposes was obtained.
The sheet obtained for evaluation purposes was subjected to the following paint film performance evaluations and the results were as shown in Table 4.
(1-1) Paint Film Appearance
The paint film appearance of the sheet for evaluation purposes was observed visually and evaluated on the basis of the following criteria:
○: When a fluorescent lamp was reflected by the paint film the outline of the fluorescent lamp was reflected distinctly.
X: When a fluorescent lamp was reflected by the paint film the outline of the fluorescent lamp was blurred.

(1-2) Water Resistance
The sheet for evaluation purposes was immersed in warm water at 40° C. for 240 hours and then the surface state of the paint film was observed visually and evaluated on the basis of the following criteria:
○: No abnormality of the paint film.
X: Abnormality such as loss of gloss or the like of the paint film.
(1-3) Impact Resistance
A weight of mass (500±1) g was dropped from a height of 20 cm onto a frame with the sheet for evaluation purposes held between the frame and a receiving table with the painted surface facing upward in accordance with "6. DuPont System" of "JIS K 5600-5-3 Falling-Weight Resistance". The damaged state of the paint surface was observed visually and evaluated on the basis of the following criteria:
○: No cracking or peeling of the paint film was seen.
X: Cracking or peeling of the paint film was seen.
(2) Evaluation of Base-concealing Properties
A sheet where a commercial white concealing paper (trade name "Rate of Concealment Test Paper", produced by the Nippon Test Panel Co.) had been stuck on the paint film surface of an electrodeposited sheet and a multi-layer paint film had been formed by coating the aqueous first base paint A-1, the aqueous second base paint and the clear paint under the same coating conditions as for forming a sheet for evaluation purposes was used as a sheet for evaluating the base concealing properties. The sheet for evaluating the concealing properties was observed visually and the extent of concealment of the multi-layer paint film which had been formed over the white concealing paper and a multi-layer paint film which had been formed on an electrodeposited paint film were compared and an evaluation was made on the basis of the following criteria:
○: Concealment on the white concealing paper and on the electrodeposited paint film are the same.
X: Concealment on the electrodeposited paint film was unsatisfactory when compared with the concealment on the white concealing paper.

Examples 2 and 3 and Comparative Examples 1 to 4

Paint film property evaluations were carried out with the same methods as in Example 1 using the aqueous first base paints indicated in Table 3. The results of the paint film performance evaluations are summarized in Table 4.

TABLE 4

|  | Example 1 | Example 2 | Example 3 | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- | --- | --- |
| Aqueous First Base Paint | A-1 | A-2 | A-3 | A-4 | A-5 | A-6 | A-7 | A-8 | A-9 |
| Paint Film Appearance | ○ | ○ | ○ | X | ○ | X | ○ | ○ | ○ |
| Water Resistance | ○ | ○ | ○ | ○ | X | ○ | ○ | ○ | ○ |
| Impact Resistance | ○ | ○ | ○ | ○ | ○ | ○ | ○ | ○ | X |
| Base Concealing Properties | ○ | ○ | ○ | ○ | ○ | ○ | X | X | ○ |

The invention claimed is:

1. A method of forming a multi-layer paint film comprising:
    forming a first base paint film in which an aqueous first base paint (A) is coated over an electrodeposited cured paint film;
    forming a second base paint film in which an aqueous second base paint (B) is coated over the first base paint film without carrying out preliminary drying by heating after forming the first base paint film;
    forming a clear paint film in which preliminary drying is carried out by heating after forming the second base paint film, a single-liquid type clear paint (C) is coated over the second base paint film; and
    heating and curing in which the first base paint film, the second base paint film, and the clear paint film are heated and cured at the same time, wherein the first base paint (A) includes water-soluble or water-dispersible polyurethane resin (A1) of acid value of less than 15 mg KOH/g and hydroxyl group value from 10 to 100 mg KOH/g and titanium oxide (A2) of specific surface area not more than 13 m$^2$/g, and the water-soluble or water-dispersible polyurethane resin (A1) includes from 4 to 15 mass % with respect to the resin solid fraction of the water-soluble or water-dispersible polyurethane resin (A1) of at least one of ethylene oxide units and propylene oxide units, and the mass content ratio of the titanium oxide (A2) is from 40 to 60 mass % with respect to the paint solid fraction of the first base paint (A).

2. The method of forming a multi-layer paint film as claimed in claim 1, wherein the water-soluble or water-dispersible polyurethane resin (A1) is a water-soluble or water-dispersible polyurethane resin which has been obtained by the reaction of a polyester polyol and a polyisocyanate compound.

3. The method of forming a multi-layer paint film as claimed in claim 1, wherein a dry film thickness of the first base paint film is from 20 to 40 μm.

4. A paint film which has been formed by means of the method of forming a multi-layer paint film as claimed in claim 1.

* * * * *